United States Patent [19]

Oonakahara et al.

[11] Patent Number: 5,285,055
[45] Date of Patent: Feb. 8, 1994

[54] IC CARD AND READ/WRITE CONTROL METHOD FOR CONTROLLING DATA READOUT/DATA WRITE-IN WITH RESPECT TO DATA STORING MEANS CONTAINED IN IC CARD

[75] Inventors: Satoru Oonakahara; Tadashi Murayama; Shouichi Ooshima, all of Tokyo, Japan

[73] Assignee: Kabushiki Kaisha Toshiba, Kawasaki, Japan

[21] Appl. No.: 757,810

[22] Filed: Sep. 11, 1991

[30] Foreign Application Priority Data

Sep. 14, 1990 [JP] Japan .................. 2-245472

[51] Int. Cl.$^5$ .............................................. G06K 5/00
[52] U.S. Cl. .................................. 235/380; 235/487
[58] Field of Search ............ 235/380, 381, 382, 382.5, 235/379, 487, 492

[56] References Cited

U.S. PATENT DOCUMENTS

| | | | |
|---|---|---|---|
| 4,734,568 | 3/1988 | Watanabe | 235/380 X |
| 4,849,614 | 7/1989 | Watanabe et al. | 235/380 X |
| 4,853,522 | 8/1989 | Ogasawara | 235/380 |
| 4,882,474 | 11/1989 | Anderl et al. | 235/380 |
| 4,885,788 | 12/1989 | Takaragi et al. | 235/382 X |
| 4,928,001 | 5/1990 | Masada | 235/380 |
| 5,039,850 | 8/1991 | Yamaguchi | 235/382.5 X |

Primary Examiner—David C. Nelms
Assistant Examiner—John R. Lee
Attorney, Agent, or Firm—Finnegan, Henderson, Farabow, Garrett & Dunner

[57] ABSTRACT

In an IC card of this invention, a plurality of password numbers are previously stored and data can be read out from the IC card and written into the IC card when any one of the plurality of password numbers is input. Further, data readout and write-in with respect to the IC card are partially limited according to the input password number.

6 Claims, 5 Drawing Sheets

IC CARD AND READ/WRITE CONTROL METHOD FOR CONTROLLING DATA READOUT/DATA WRITE-IN WITH RESPECT TO DATA STORING MEANS CONTAINED IN IC CARD

BACKGROUND OF THE INVENTION

1. Field of the Invention

This invention relates to an IC card containing a CPU and a memory, for storing seat reservation data, for example, and a read/write control method for controlling the operation of reading out data stored in a memory contained in the IC card and writing data into the memory.

2. Description of the Related Art

In general, in order to prevent a third person other than the owner of an IC card from easily using the IC card, the operation of reading out and writing data with respect to the IC card is controlled by a password number. That is, if the same number as the password number previously registered in the IC card is not input, the read/write operation is inhibited.

A seat reservation system is an example of a system using the IC card. The seat reservation system is briefly explained below. First, the owner of the IC card, that is, a person who wants to make the seat reservation, inserts his own IC card into an IC card terminal provided on the street or in his house and then inputs the password number by use of the keyboard of the IC card terminal. If the input password number is correct, the IC card terminal connects a communication line between it and the central terminal and transmits data input by use of the keyboard indicating a desired section, desired data and the like to the central terminal by data communication. The central terminal informs the IC card terminal of the fact that the reservation has been accepted, and stores various reservation data into the IC card.

Thus, the reservation data is stored in the IC card and the owner may confirm the reservation data by inputting the password number using the keyboard of the IC card and specifying the identification of the reservation data (by depressing a specified key, for example) to display the reservation data on a display unit such as an LCD provided on the IC card.

In order to have the seat ticket issued, the owner goes to the ticket window of the service office and presents the IC card to the service office man. The office man or operator inserts the IC card into the ticket issuing machine and inputs the password number, then the ticket issuing machine accesses the IC card by use of the password number, reads out the reservation data and issues a ticket.

Since a single password number is given to each IC card, it is necessary for the owner of the IC card to inform the office man of the password number so that he can operate the ticket issuing machine and input the password number in order to have a ticket issued, and it is extremely inconvenient.

Further, since the office man may access the memory in the IC card after the office man has input the password number to access the IC card, it becomes possible for the office man to observe data such as personal data other than the reservation data.

SUMMARY OF THE INVENTION

An object of this invention is to provide an IC card from which a specified person such as an office man for issuing a seat ticket who is different from the owner of the IC card can read data stored therein without assistance of the owner.

Another object of this invention is to provide an IC card from which a specified person such as an office man for issuing a seat ticket who is different from the owner of the IC card can read data stored therein without assistance of the owner and which has high secrecy of data stored therein.

The above object can be attained by a recording device comprising:
data storing means for storing data;
password data storing means storing a plurality of registered password data items previously set;
password data receiving means for receiving input password data;
collating means for collating the input password data received by the password data receiving means with the plurality of registered password data items; and
control means for permitting data to be read out from or written into the data storing means when it is detected as the result of collation by the collating means that the input password data coincides with one of the plurality of registered password data items.

Further, the above object can be attained by a method comprising the steps of:
receiving input password data;
collating the input password data with a plurality of registered password data items; and
permitting data to be read out from or written into data storing means when it is detected in the collation step that the input password data coincides with one of the plurality of registered password data items.

Further, the above object can be attained by a method comprising the steps of:
receiving input password data;
collating the input password data with a plurality of registered password data items; and
permitting only specified data among data stored in data storing means to be read out when it is detected in the collation step that the input password data coincides with one of the plurality of registered password data items and if the registered password data item which coincides with the input password data is preset specified password data, and permitting data to be freely read out from or written into the data storing means if the registered password data item which coincides with the input password data is not the preset specified password data.

Further, the above object can also be attained by a method comprising the steps of:
receiving input password data;
collating the input password data with a plurality of registered password data items; and
permitting data to be read out from or written into only that area of data storing means which corresponds to the input password data when it is detected in the collation step that the input password data coincides with one of the plurality of registered password data items.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

First Embodiment

There will now be described a first embodiment of this invention with reference to the accompanying drawings.

Figure 1:
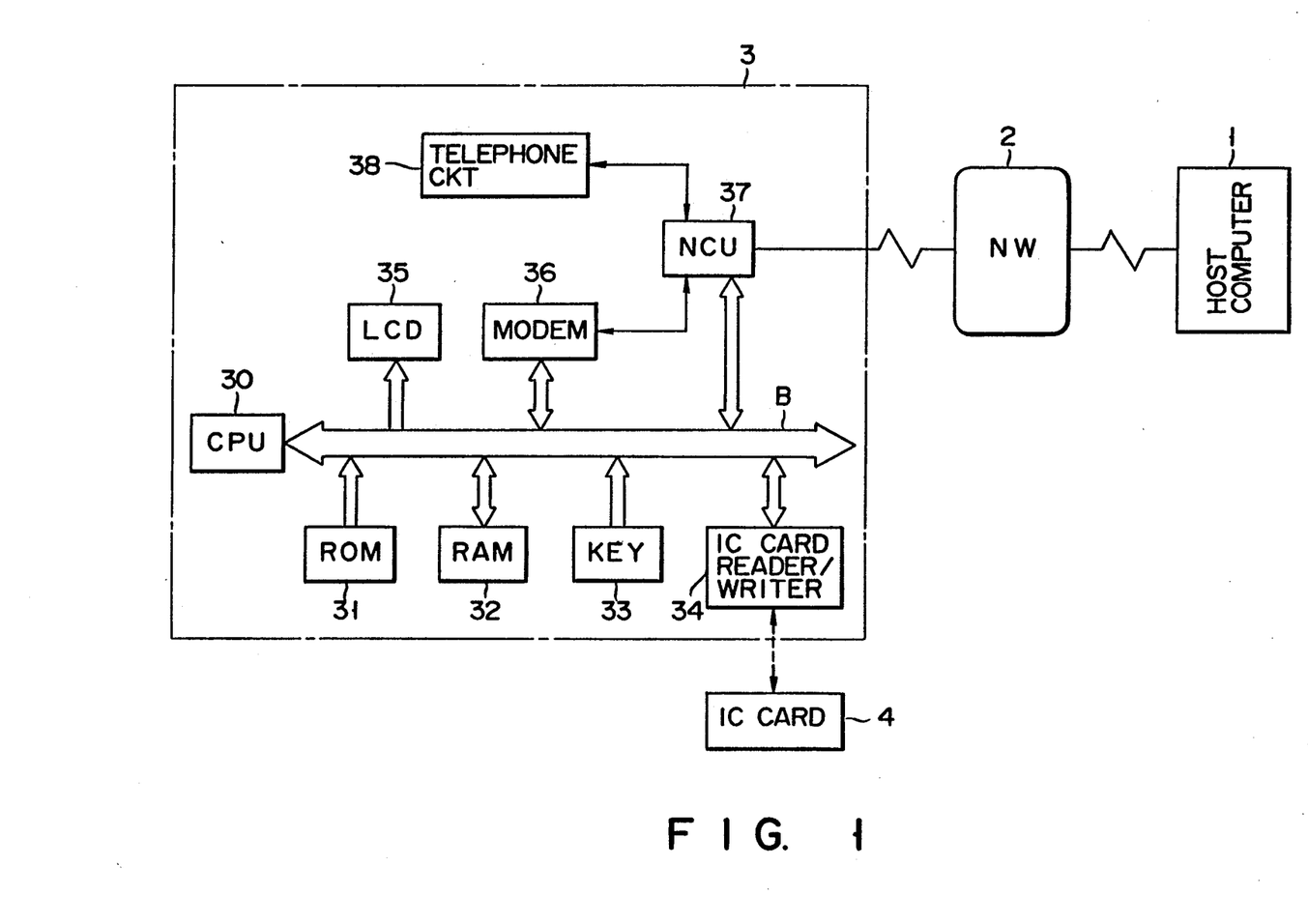
FIG. 1 is a block diagram showing the construction of a seat reservation system which is constructed by use of an IC card according to this invention.

FIG. 1 is a block diagram showing the construction of a seat reservation system which is constructed by use of an IC card according to this invention.

The system includes a host computer 1, network (NW) 2, IC card terminal 3 and IC card 4. The host computer 1 is installed in the reservation center of the service office for providing the seat reservation service. The host computer 1 entirely controls various data concerning the seat reservation. The network 2 is a public telephone network, for example, and provides a communication line between the host computer 1 and the IC card terminal 3.

The IC card terminal 3 includes a CPU 30, ROM 31, RAM 32, keyboard (KEY) 33, IC card reader/writer 34, liquid crystal display unit (LCD) 35, modem 36, network control unit (NCU) 37, telephone circuit 39 and bus B. The CPU 30 entirely controls the IC card terminal 3. The CPU 30 is connected to the ROM 31, RAM 32, keyboard 33, IC card reader/writer 34, LCD 35 and NCU 37 via the bus B.

The ROM 31 stores the processing program of the CPU 30. The RAM 32 stores various data necessary for the processing of the CPU 30. The keyboard 33 receives various instructions input to the CPU 30 by the operator of the IC card terminal 3. The IC card reader/writer 34 reads out data stored in the IC card 4 and writes data into the IC card 4. The LCD 35 displays various data for the operator. The modem 36 modulates data transmitted to the CPU 30 and demodulates data transmitted from the host computer 1. The NCU 37 effects the connection control of the network (for example, recovery and starting of the station exchange, transmission of the selection signal, detection of the call signal). The NCU 37 connects a subscriber's line of the network 2 to the modem 36 or telephone circuit 39.

Figure 2:
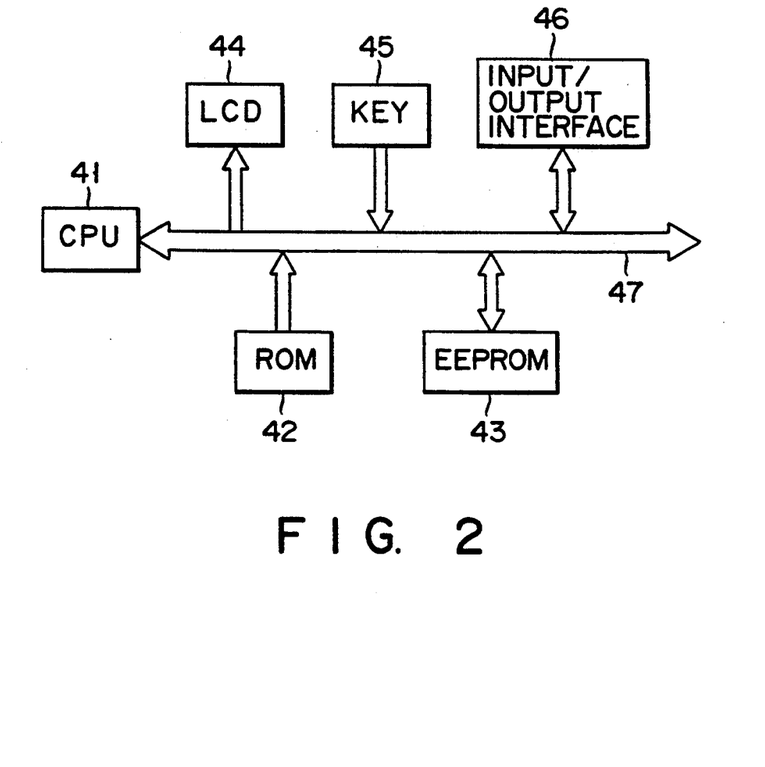
FIG. 2 is a block diagram showing the construction of an IC card according to a first embodiment of this invention.

FIG. 2 is a block diagram showing the construction of the IC card 4.

The IC card 4 includes a CPU 41, ROM 42, EEPROM 43, LCD 44, keyboard (KEY) 45, input/output interface 46 and bus 47. The CPU 41 entirely controls the IC card 4. The CPU 41 is connected to the ROM 42, EEPROM 43, LCD 44, keyboard (KEY) 45 and input/output interface 46 via the bus 47.

The ROM 42 stores the processing program of the CPU 41. The EEPROM 43 stores various data necessary for the processing of the CPU 41. The LCD 44 displays various data such as seat reservation data for the operator. The keyboard 45 receives various instructions input to the CPU 41 by the owner of the IC card 4. The input/output interface 46 provides an interface with respect to the IC card reader/writer 34 when it is inserted into the IC card terminal 3.

Figure 3:
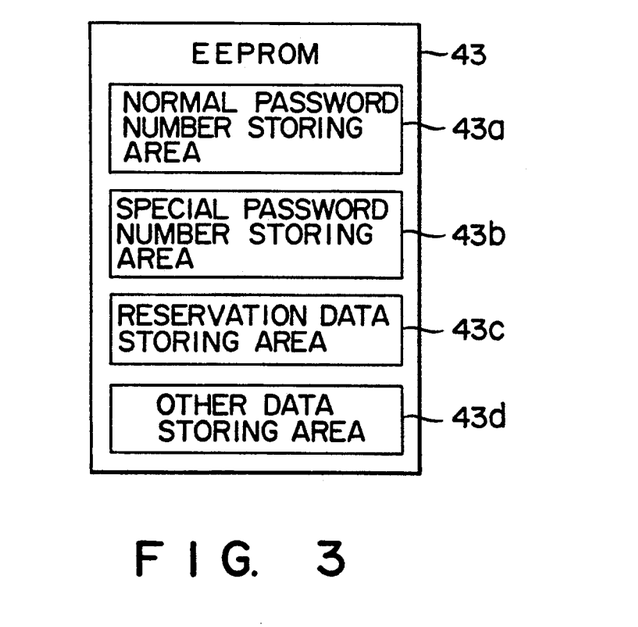
FIG. 3 is a diagram showing a model of a memory map of an EEPROM of the IC card shown in FIG. 2.

FIG. 3 is a diagram showing a model of a memory map of the EEPROM 43. In the EEPROM 43, a normal password number storing area 43a, special password number storing area 43b, reservation data storing area 43c and other data storing area 43d are set. It should be noted here that different password numbers are respectively registered in the normal password number storing area 43a and special password number storing area 43b when the IC card is issued. At this time, the password number stored in the normal password number storing area 43a is a password number (which is hereinafter referred to as a normal password number) for the owner and the password number stored in the special password number storing area 43b is a password number (which is hereinafter referred to as a special password number) for the service office man. In this embodiment, the normal password number is a 4-digit number (which is different for each IC card) having a numeral of 0 to 9 in the first digit and the special password number is a 5-digit number (which is a special number commonly used for the IC cards) having a mark "*" in the first digit. The reservation data storing area 43c is an area for storing reservation data such as the section and desired data concerning the seat reservation. The other data storing area 43d is an area used by the owner for storing personal data or other data if necessary.

Next, the operation of the IC card 4 of the above construction is explained according to the operation procedure of the CPU 41.

Figure 4:
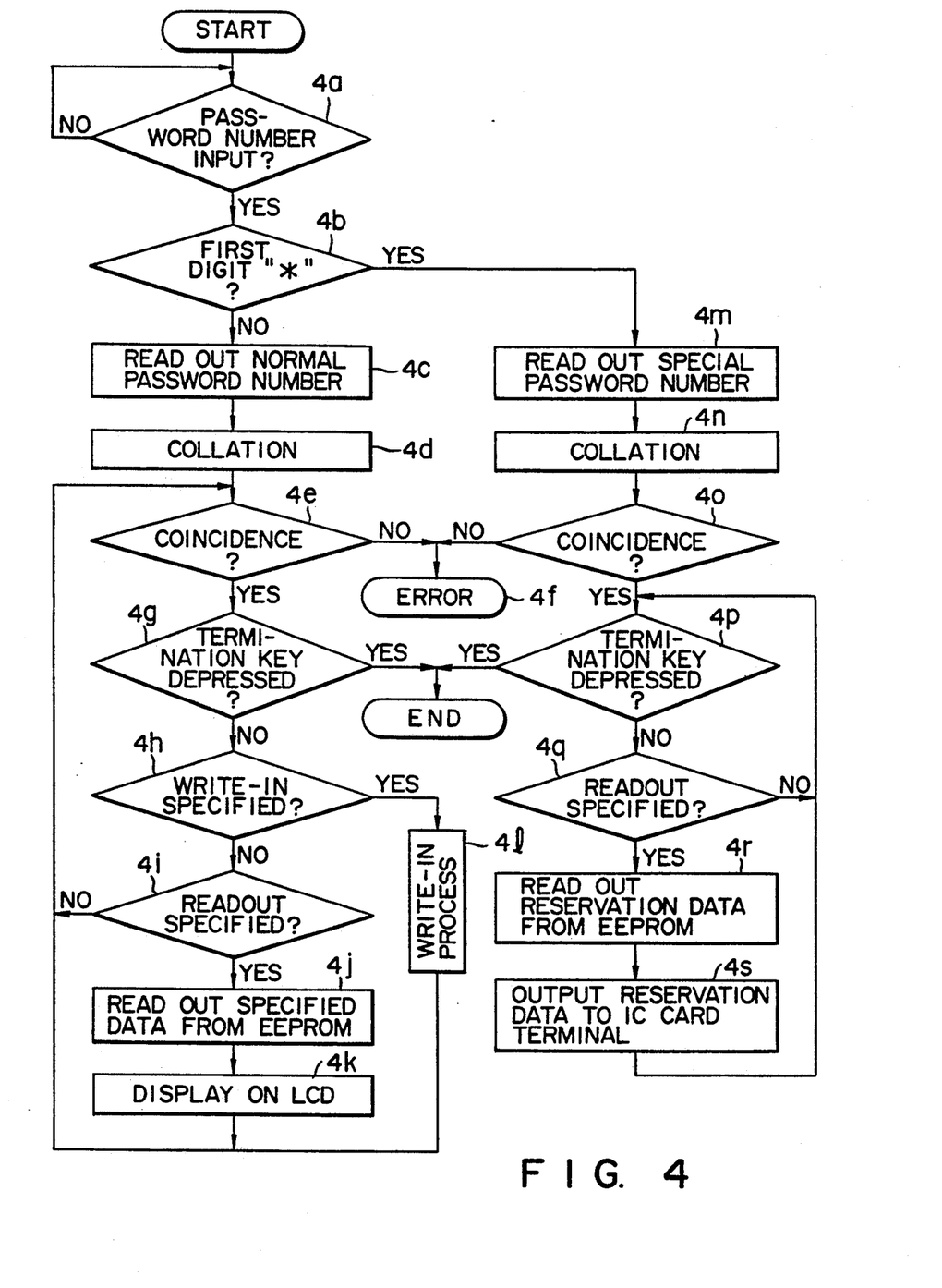
FIG. 4 is a flowchart showing the operation procedure of a CPU in the IC card shown in FIG. 2.

First, the CPU 41 starts the process in response to the depression of the starting key on the keyboard 45. After the process is started, the CPU 41 waits for a password number to be input in the step 4a as shown in FIG. 4.

If the owner of the IC card 4 inputs the normal password number by means of the keyboard 45 of the I card 4 to access the IC card 4 or inputs the password number by means of the keyboard 33 of the IC card terminal 3 after setting the IC card 4 into the IC card terminal 3 while the CPU 41 is waiting for input of the password number, the process of the CPU 41 is changed from the step 4a to the step 4b. In the step 4b, the CPU 41 checks whether the first digit of the input password number is "*" or not, that is, whether the input password number corresponds to a normal password number or a special password number.

In this example, since the password number input by the owner of the IC card 4 is a normal password number, the CPU 41 processes the step 4c. In the step 4c, the CPU 41 reads out a normal password number from the normal password number storing area 43a of the EEPROM 43. After this, the CPU 41 collates the normal password number read out in the step 4c with the input password number in the step 4d. Then, in the step 4e, the CPU 41 checks whether the input password number and the normal password number coincide with each other based on the result of the collation in the step 4d.

If the input password number and the normal password number do not coincide with each other, the CPU 41 effects the error process in the step 4f by causing the LCD 44 to display that the password number is incorrect, for example, and then completes the process.

On the other hand, if the input password number and the normal password number coincide with each other, the CPU 41 responds to the instruction from the owner according to the following process since a person who operates the IC card 4 is the owner of the IC card 4. First, the CPU 41 changes the process from the step 4e to the step 4g. In the steps 4g to 4i, the CPU 41 waits for depression of the termination key, input of write-in instruction or input of readout instruction. If the readout instruction is input by means of the keyboard 45 or 33, CPU 41 changes the process from the step 4i to the step 4j. In the steps 4j, the CPU 41 reads out data specified by the readout instruction from the EEPROM 43. After this, in the step 4k, the CPU 44 causes the LCD 44 to display data read out in the step 4j and then effects the process succeeding the step 4g. Thus, the owner can confirm the reservation data and personal data based on the data displayed on the LCD 44. That is, the owner can confirm the reservation data and personal data by inputting the normal password number by use of the keyboard 45 of the IC card 4.

Further, if the write-in instruction is input by means of the keyboard 45 or 33 in the instruction waiting state of the steps 4g to 4i, the CPU 41 changes the process from step 4h to the step 4l. In the step 4l, the CPU 41 effects the write-in process of storing data input by means of the keyboard 45 or data input from the IC card terminal 3 via the input/output interface 46 into a preset storing area of the EEPROM 43 and then effects the process succeeding the step 6g. Thus, the owner can write personal data and the like.

If the termination key in the keyboard 45 is depressed in the instruction waiting state of the steps 4g to 4i, the CPU 41 terminates the process.

When making the seat reservation, the owner of the card 4 sets the IC card 4 into the IC card reader/writer 34 of the IC card terminal 3. Then, the owner of the IC card 4 specifies the seat reservation by depressing preset keys on the keyboard 33.

The CPU 30 of the IC card terminal 3 gives an instruction to the NCU 37 according to the above operations so as to set up a line with respect to the host computer 1. The NCU 37 generates a telephone number of the host computer 1 in response to the above instruction so as to set up a line with respect to the host computer 1.

If, in this state, the owner of the IC card 4 inputs a password number by use of the keyboard 33, the CPU 30 supplies the input password number to the IC card 4 via the IC card reader/writer 34. In the IC card 4, the CPU 41 receives the input password number supplied from the IC card terminal 3 via the input/output interface 46. After this, the CPU 41 effects the process of the steps 4a to 4e in the same manner as the operation described before. When it is detected in the step 4e that the input password number and the normal password number do not coincide with each other, the CPU 41 gives an instruction to the CPU 30 in the step 4f so as to cause the LCD 35 to display an error. Further, if it is detected in the step 4e that the input password number and the normal password number coincide with each other, the CPU 41 changes the process from the step 4e to the step 4g.

In the IC card terminal 3, the CPU 30 effects the data communication with respect to the host computer 1 according to the instruction input via the keyboard 33 and makes the seat reservation with respect to the host computer 1. Then, the CPU 30 supplies the reservation data transmitted from the host computer 1 to the IC card 4 via the IC card reader/writer 34 and gives a write-in instruction to the CPU 41. The CPU 41 changes the process from the step 4h to the step 4l in response to the write-in instruction. In the step 4l, the CPU 41 writes the reservation data given from the IC card terminal 3 as described above into the reservation data storing area 43c of the EEPROM 43. As a result, the reservation data can be stored into the IC card 4.

When the owner of the IC card 4 wants to have a seat ticket issued, the owner of the IC card 4 takes the IC card 4 having the reservation data stored therein as described above to the ticket window of the service office. Then, the service office man sets the IC card 4 into the IC card terminal 3 installed in the ticket window and inputs a password number by operating the keyboard 33. When the password number is thus input from the keyboard 33, the CPU 30 supplies the password number to the IC card 4 via the IC card reader/writer 34. When the CPU 41 of the IC card 4 has received the input password number from the IC card terminal 3, it changes the process from the step 4a to the step 4b to check whether the input password number corresponds to a normal password number or special password number.

The password number used by the service office man is a special password number and the first digit of the password number is "*". Then, the CPU 41 changes the process from the step 4b to the step 4m. In the step 4m, the CPU 41 reads out a special password number from the special password number storing area 43b of the EEPROM 43. Then, in the step 4n, the CPU 41 collates the special password number read out in the step 4m and the input password number with each other. After this, in the step 4o, the CPU 41 determines whether the input password number coincides with the special password number or not according to the result of collation in the step 4n.

If the input password number and the special password number do not coincide with each other, the CPU 41 effects an error process in the step 4f by causing the LCD 44 to display that the password number is incorrect, for example, and then terminates the process.

If it is detected in the step 4o that the input password number and the special password number coincide with each other, the CPU 41 responds to the instruction of the service office man according to the following process since a person who operates the IC card 4 is a service office man. First, the CPU 41 changes the process from the step 4o to the step 4p. In the steps 4p and 4q, the CPU 41 waits for depression of the termination key or input of the readout instruction of the reservation data.

If, in this state, the service office man depresses the ticket issuing key of the keyboard, 33, the CPU 30 gives an instruction of readout of the reservation data to the CPU 41 via the IC card reader/writer 34. The CPU 41 changes the process from the step 4q to the step 4r in response to the instruction. In the step 4r, the CPU 41 reads out the reservation data stored in the reservation data storing area 43c of the EEPROM 43. Then, in the step 4s, the CPU 41 outputs the reservation data read out in the step 4r to the IC card terminal 3 via the input-/output interface 46.

If the termination key of the keyboard 33 is depressed in the instruction waiting state of the steps 4p to 4q and when the CPU 30 informs the CPU 41 of this operation, then the CPU 41 terminates the process. Even if an instruction of reading out or writing data other than the reservation data is input in the instruction waiting state of the steps 4p and 4q, the CPU 41 neglects the input of the instruction.

In the IC card terminal 3, the CPU 30 collates the reservation data supplied from the IC card 4 with the reservation data registered in the host computer 1 to confirm the reservation and then issues a seat ticket.

Thus, according to this embodiment, not only a password number (normal password number) for the owner but also a password number (special password number) for the service office man is set and access to the IC card is permitted even when the special password number for the service office man is input. Therefore, the service office man can effect the ticket issuing operation to read out the reservation data from the IC card 4 without using the normal password number, that is, without assistance of the owner. Further, when the service office man uses the special password number to access the IC card, the service office man cannot observe data such as the personal data since data other than the reservation data is not output from the IC card 4.

Since the special password number is commonly used for each card, the service office man is only required to input the same password number in the ticket issuing operation and the operation can be easily effected.

This invention is not limited to the above embodiment. For example, in the above embodiment, only the reservation data can be read out when the special password number is input, but if no personal data is written into the IC card and data with high secrecy is not stored into the IC card, the IC card can be modified such that data to be read out is not limited and only the data write-in operation is inhibited. Further, in the above embodiment, the service office man processes the IC card by use of the IC card terminal, but it is possible to operate the built-in keyboard so as to display data on the built-in display unit.

In the above embodiment, the IC card has an EEPROM, but the EEPROM can be replaced by a RAM.

In the above embodiment, the IC card according to this invention is applied to the seat reservation system, but it can be applied to other various service operations or to a plurality of service operations. In this case, it is preferable to set special password numbers for respective service operations. In addition, this invention can be variously modified without departing from the technical scope thereof.

Second Embodiment

Now, the second embodiment of this invention is explained with reference to the accompanying drawings.

Figure 5:
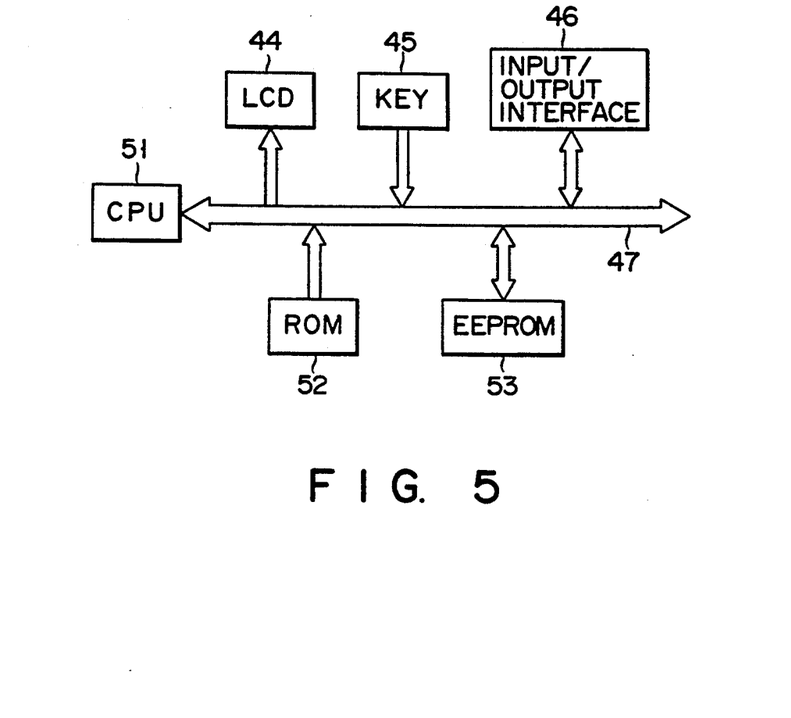
FIG. 5 is a block diagram showing the construction of an IC card according to a second embodiment of this invention.

FIG. 5 is a block diagram showing the construction of a seat reservation system constructed by using an IC card according to this invention. Portions of FIG. 5 which are the same as those of FIG. 2 are denoted by the same reference numerals.

The IC card includes a CPU 51, ROM 52, EEPROM 53, LCD 44, keyboard (KEY) 45, input/output interface 46 and bus 47. The CPU 51 entirely controls the IC card. The CPU 51 is connected to the ROM 52, EEPROM 53, LCD 44, keyboard (KEY) 45 and input/output interface 46 via the bus 47.

The ROM 52 stores the processing program of the CPU 51. The EEPROM 53 stores various data necessary for the process of the CPU 51.

Figure 6:
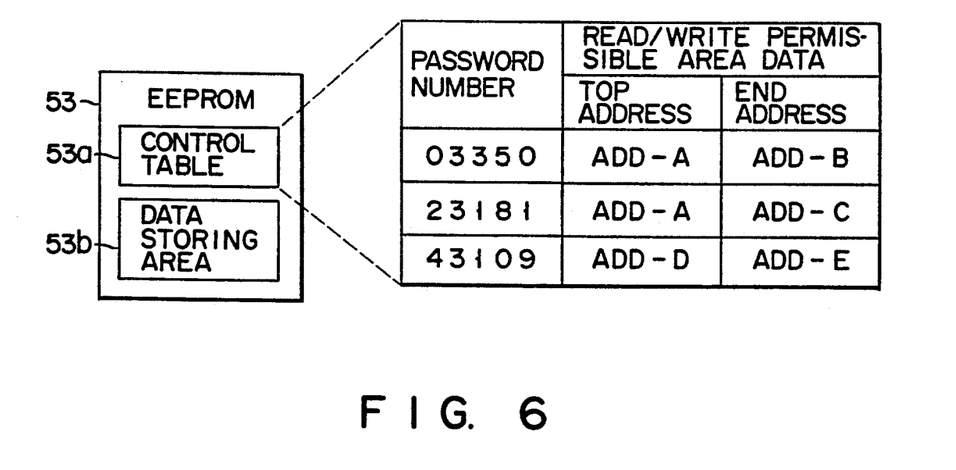
FIG. 6 is a diagram showing a model of a memory map of an EEPROM of the IC card shown in FIG. 5.

FIG. 6 is a diagram showing a model of a memory map of the EEPROM 53. A control table 53a and data storing area 53b are set in the EEPROM 53. A plurality of password numbers (three password numbers in FIG. 6) are registered in the control table 53a when the IC card is issued. Further, readout/write-in permissible area data items for the respective password numbers are registered. The readout/write-in permissible area data indicates a desired area in the data storing area 53b and is constructed by the top address and end address of the area. The data storing area 53a is an area for storing reservation data, personal data and other data when required.

Next, the operation of the IC card with the above construction is explained according to the operation procedure of the CPU 51.

Figure 7:
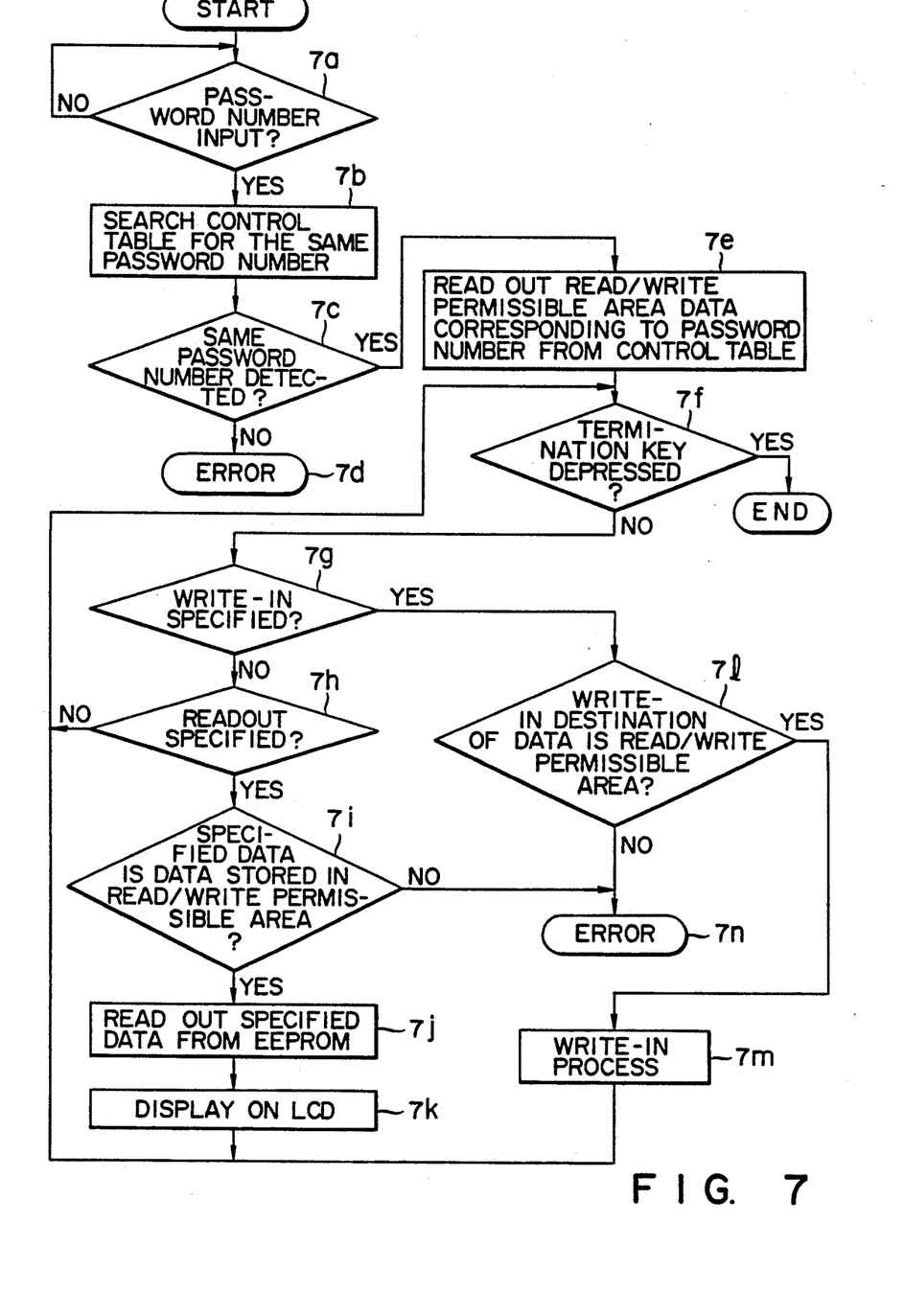
FIG. 7 is a flowchart showing the operation procedure of a CPU in the IC card shown in FIG. 5.

The CPU 51 starts the process in response to depression of the start key of the keyboard 45. After starting the process, the CPU 51 waits for input of a password number in the step 7a as shown in FIG. 7. If a password number is input from the keyboard 45 or the IC card terminal 3 via the input/output interface 4, the CPU 51 changes the process from the step 7a to the step 7b. In the step 7b, the CPU 51 searches the control table 53a of the EEPROM 53 for a password number which is the same as the input password number. Then, in the step 7c, the CPU 51 determines whether a password number which is the same as the input password number is present or not.

If a password number which is the same as the input password number is not detected, the CPU 51 effects the error process in the step 7d by causing the LCD 44 to display that the password number is incorrect, for example, and then completes the process.

On the other hand, if a password number which is the same as the input password number is detected, the CPU 51 changes the process from the step 7c to the step 7e. In the step 7e, the CPU 51 reads out the read/write permissible data registered in accordance with the password number from the control table 53a. After this, the CPU 51 changes the process to the step 7f. In the steps 7f to 7h, the CPU 51 waits for depression of the termination key, input of the write-in instruction and input of the readout instruction. Then, if the readout instruction is input by means of the keyboard 45 or 33, the CPU 51 changes the process from the step 7h to the step 7i. In the step 7i, the CPU 51 checks whether or not data which is specified for readout coincides with data which is stored in the read/write permissible area indicated by the read/write permissible area data read out in the step 7e.

If, in this case, the data which is specified to be read out coincides with the data which is stored in the read/write permissible area, the CPU 51 changes the process from the step 7i to the step 7j. In the step 7j, the CPU 51 reads out the data which is specified for readout from the data storing area 53a of the EEPROM 53. Then, in the step 7k, the CPU 51 causes the LCD 44 to display data read out in the step 7j and effects the process succeeding the step 7f.

If the write-in instruction is input by means of the keyboard 45 or 33 in the instruction waiting state of the steps 7g to 7i, the CPU 51 changes the process from the step 7g to the step 7l. In the step 7l, the CPU 51 checks whether or not the write-in destination of the specified data coincides with the read/write permissible area indicated by the read/write permissible area data read out in the step 7e.

If the specified write-in destination coincides with the read/write permissible area, the CPU 51 changes the process from the step 7l to the step 7m. In the step 7m, the CPU 51 effects the write-in process by storing data input by means of the keyboard 45 or data input from the IC card terminal 3 via the input/output interface 46 into a specified area of the data storing area 53b, for example, and then effects the process succeeding the step 7f.

When data specified for readout does not coincide with data stored in the read/write permissible area or the specified destination does not coincide with the read/write permissible area, the CPU 51 changes the process from the step 7i or 7l to the step 7n, effects the error process by informing the LCD 44 that readout of the specified data or write of data into the specified destination is inhibited, and then terminates the process.

Thus, according to this embodiment, data which can be read out or written in by use of a plurality of password numbers can be limited. Therefore, the same effect as that obtained in the first embodiment can be attained and data which can be read out or written can be partially superposed, thus it becomes convenient.

This invention is not limited to the above embodiment. For example, in the above embodiment, three password numbers are set, but two or more than three password numbers may be set. Further, this invention can be variously modified without departing from the technical scope thereof.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. In a system including a host computer, a network, and a terminal unit having terminal input means and connected to said host computer via said network, an IC card selectively connected to said terminal unit and which comprises:
   card input means by means of which an owner inputs data and personal password data;
   data storing means for storing data input via said card input means;
   password data storing means for storing a plurality of registered password data items which are previously registered, the registered password data items including at least one personal password data item and at least one specific password data item assigned to a third person;
   password data receiving means for receiving one of an input password data input by the owner via said card input means and an input password data input by the third person via said terminal input means;
   collating means for collating the input password data received by said password data receiving means with said plurality of required password data items; and
   control means for allowing reading out of data from and writing of data into said data storing means when said collating means detects coincidence of the input password data with one of said plurality of registered password data items.

2. An IC card according to claim 1, wherein said data storing means stores preset data as well as the input data, and said control means allows reading out of only the preset data from said data storing means when the one registered password data item which coincides with the input password data is a specific password data item.

3. An IC card according to claim 1, wherein said data storing means has a plurality of memory areas respectively assigned to said plurality of registered password data items, and said control means allows reading out of data from and writing data into the area which is assigned to the one registered password data item which coincides with the input password data.

4. In a system including a host computer, a network, and a terminal unit having terminal input means and connected to said host computer via said network, a read/write control method for controlling reading out and writing of data from and into data storing means contained in an IC card selectively connected to said terminal unit, said method comprising the steps of:
   receiving input password data input from one of input means of said IC card and said terminal input means;
   collating the input password data with a plurality of registered password data items previously registered in said IC card; and
   allowing reading out and writing of data from and into said data storing means when the input password data coincides with one of said plurality of registered password data items.

5. A read/write control method according to claim 4, wherein
   said allowing step includes the steps of:
   reading out only specified data among data stored in said data storing means when the registered password data item which coincides with the input password data is preset specific password data, and
   freely allowing reading out and writing of data into said data storing means when the registered password data item which coincides with the input password data is not the preset specific password data.

6. A rad/write control method according to claim 4, wherein
   said allowing step includes the steps of:
   preparing in said data storing means a plurality of memory areas respectively assigned to said plurality of registered password data items, and
   allowing reading out and writing of data from and into only one of the memory areas which corresponds to the input password data when the input password data coincides with one of said plurality of registered password data items.

* * * * *

UNITED STATES PATENT AND TRADEMARK OFFICE
CERTIFICATE OF CORRECTION

PATENT NO. : 5,285,055
DATED : February 08, 1994
INVENTOR(S) : Satoru Oonakahara et al.

It is certified that error appears in the above-indentified patent and that said Letters Patent is hereby corrected as shown below:

Claim 6, column 10, line 56, change "rad" to --read--.

Signed and Sealed this

Twenty-seventh Day of December, 1994

Attest:

BRUCE LEHMAN

Attesting Officer     Commissioner of Patents and Trademarks